(No Model.)
E. J. PRECOURT.
HOSE AND PIPE COUPLING.
No. 557,019. Patented Mar. 24, 1896.
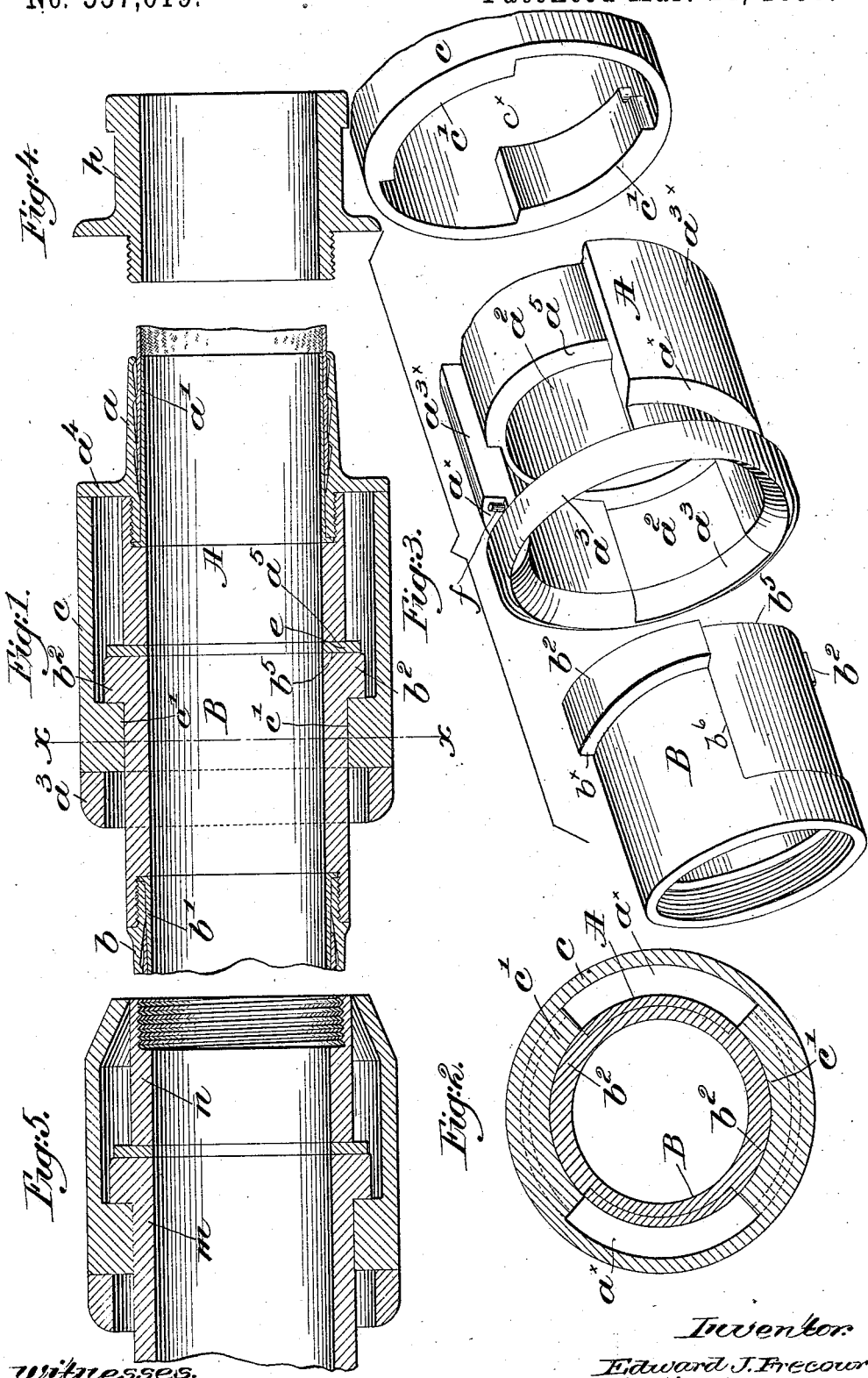
Witnesses.
Fred S. Greenleaf.
Thomas F. Drummond.
Inventor.
Edward J. Precourt
by Crosby & Gregory, attys.

UNITED STATES PATENT OFFICE.

EDWARD J. PRECOURT, OF MARLBOROUGH, MASSACHUSETTS, ASSIGNOR OF ONE-FOURTH TO JOSEPH CHABOT, OF SAME PLACE.

HOSE AND PIPE COUPLING.

SPECIFICATION forming part of Letters Patent No. 557,019, dated March 24, 1896.

Application filed March 15, 1895. Serial No. 541,897. (No model.)

*To all whom it may concern:*

Be it known that I, EDWARD J. PRECOURT, of Marlborough, county of Middlesex, State of Massachusetts, have invented an Improvement in Hose and Pipe Couplings, of which the following description, in connection with the accompanying drawings, is a specification, like letters on the drawings representing like parts.

This invention has for its object to simplify and improve pipe or hose couplings, whereby coupling and uncoupling may be more expeditiously effected and a tight coupling or union obtained.

Prior to my invention in couplings of this class one of the coupling members has usually been provided with a rotatable coupling-sleeve, threaded to engage corresponding threads on the other member and furnishing means whereby the two members might be drawn together.

In my present invention the usual threaded coupling-sleeve is dispensed with, and in place thereof is provided what is in effect a cam ring or sleeve loosely mounted on one of the members and adapted to co-operate with one or more lugs or projections on the other member, a partial (usually a quarter) rotation of said ring or sleeve being sufficient to effect the operations of coupling and uncoupling.

The particular features of my invention will be hereinafter described and pointed out in the claims.

In the drawings, Figure 1 is a vertical longitudinal section of a coupling embodying this invention. Fig. 2 is a cross-section of the same on the dotted line $x\ x$. Fig. 3 in perspective shows the two coupling members separated slightly with the coupling or cam ring at the back of the same; Fig. 4, a detail showing the nozzle attachment, and Fig. 5 a sectional detail illustrating a modification of my invention.

In the embodiment of my invention taken for illustration and shown in the drawings, A B are the two coupling members, each interiorly threaded at their outer ends, respectively, to receive the holding members or glands $a\ b$, which clamp the hose or pipe tightly between themselves and the thimbles $a'\ b'$.

The member A being of sufficient size to receive the member B, the former may be called the "female" and the latter the "male" member.

The male member B is shown provided at its end with one or more (preferably two) diametrically-opposite clamping-lugs $b^2$, and the female member A is slotted at diametrically-opposite points, as at $a^2$, or at such other points as register with and to receive the lugs $b^2$. The male member preferably also has the longitudinal ribs $b^6$, Fig. 3, which register with the slots $a^2$ to aid the lugs $b^2$ in preventing rotation of the male member relatively to the female member, or to themselves prevent such rotation in case the lugs $b^2$ are shorter and do not register with the slots $a^2$.

Between and restrained from longitudinal movement by the flanged front end, $a^3$, of the member A and the flange $a^4$ of the gland $a$, I have herein shown a rotatable cam or clamping ring or sleeve $c$, provided with one or more clamping-lugs $c'$, preferably of a number and location corresponding with the location of the lugs $b^2$ on the male member B. Between the slots $a^2$ the member A is thickened, as at $a^{3\times}$, to nearly the diameter of the interior of the ring or sleeve $c$, (see Fig. 3,) leaving a shoulder $a^\times$.

To couple the two members together, the male member B is inserted in the female member A, with the lugs $b^2$ entering the slots $a^2$ until the ends or faces $b^5\ a^5$ contact with, it may be, a packing ring or washer $e$ between. The sleeve $c$ is now rotated to bring the lugs $c'$ between the lugs $b^2$ of the male member and the front flange $a^3$ of the female member, thus locking the two tightly together.

The back faces $b^\times$ of the lugs $b^2$ and the back faces $c^\times$ of the lugs $c'$ of the sleeve $c$ may, and preferably will, be either or both made more or less cam-shaped, as shown, to enable rotation of the sleeve to draw the male member tightly into the female member and against the packing-ring between their face or abutting ends.

A suitable stop $f$ limits the rotative movement of sleeve $c$, and the side walls of the slots $a^2$ serve to prevent relative rotation of the coupling members by abutting against the sides of the ribs $b^6$ of the male member.

My improved coupling is particularly adapted for use as a hose-coupling for fire and kindred purposes; but my said invention is not limited in this respect. For example, in Fig. 4 I have shown a nozzle $h$, adapted to screw into the female member A in place of the gland $a$, Fig. 1, thus making it possible to easily convert the coupling into a nozzle. Again, in Fig. 5 I have shown the male member $m$ as a part of a hydrant, the same corresponding in shape and construction to the end of the male member B described. The female member $n$ is also practically the same as in Fig. 1, its end in Fig. 5 being drawn down on a taper, as shown.

My invention is not limited to the particular embodiment of my invention herein shown, for the same may be varied without departing from the spirit and scope of the invention.

I claim—

1. In a coupling, the externally-flanged female member, provided circumferentially, intermediate of its length, with an internal flange, and longitudinally from said internal flange to its outer end with shouldered recesses, and the sleeve rotatable on said member to bear against said external flange and provided with internal lugs, arranged to slide in a groove or way provided therefor in said female member, combined with the male member having external lugs to co-operate with said internal lugs, one or both of said sets of lugs having cam-surfaces on their inner edges, said male member also having a longitudinal rib or ribs extending from said external lugs, to fit within said shouldered recesses, with their peripheral surfaces extending flush with the bottom of said groove or way to receive and support said internal lugs when said sleeve is rotated into locking position, substantially as described.

2. In a pipe-coupling, the combination with the cylindrical female member, flanged at its outer end, provided with a groove adjacent thereto, said member also having an internal circumferential packing-flange and also provided with internal and external recesses extending longitudinally in opposite directions from said internal flange, and a sleeve arranged thereon to bear against said external flange and provided internally at its outer end with lugs to receive the said external recesses and to co-operate with said groove, being extended at its inner end to inclose said female member, of a male member provided with external lugs arranged to co-operate with the sleeve-lugs and also provided with longitudinal ribs extending from said external lugs to co-operate with said internal recesses, and a packing-ring arranged against said internal flange to bear against the outer end of said male member, substantially as described.

3. In a coupling, the externally-flanged female member, provided circumferentially, intermediate of its length, with an internal packing-flange, and longitudinally from said packing-flange to its outer end, with shouldered recesses, and the sleeve rotatable on said member to bear against said external flange and provided with internal lugs, combined with the male member having external lugs to co-operate with said internal lugs, one or both of said sets of lugs having cam-surfaces on their inner edges, said male member also having a longitudinal rib or ribs extending from said external lugs to fit within said shouldered recesses, substantially as described.

4. In a pipe-coupling, the combination with the cylindrical female member, flanged at its outer end, provided with a groove adjacent thereto, said member also having an internal circumferential packing-flange and also provided with internal and external recesses extending longitudinally in opposite directions from said internal flange, and a sleeve arranged thereon to bear against said external flange and provided internally at its outer end with lugs to receive the said external recesses and to co-operate with said groove, being extended at its inner end to inclose said female member, and a gland removably secured to the inner end of said female member and provided with an external flange to bear against the extended portion of said sleeve and flush with the outer surface thereof, of a male member provided with external lugs arranged to co-operate with the sleeve-lugs, and also provided with longitudinal ribs extending from said external lugs to co-operate with said internal recesses, and a packing-ring arranged against said internal flange to bear against the outer end of said male member, substantially as described.

5. In a pipe-coupling, the combination with the cylindrical female member, flanged at its outer end, provided with a groove adjacent thereto, said member also having an internal circumferential flange, and also provided with internal and external recesses extending longitudinally in opposite directions from said internal flange, whereby inner longitudinal shoulders are provided, and whereby also an external thickened portion is provided extending between said external recesses and terminating at its forward end to constitute a shoulder for said groove, and a sleeve arranged thereon to bear against said external flange and provided internally at its outer end with lugs to receive the said external recesses and to co-operate with said groove, being extended at its inner end to rest on said thickened portion and to inclose said female member, of a male member provided with external lugs arranged to co-operate with the sleeve-lugs and provided with longitudinal ribs extending from said external lugs to co-operate with said internal recesses, said ribs having their peripheral surfaces extending flush with the bottom of said groove or way, substantially as described.

In testimony whereof I have signed my name to this specification in the presence of two subscribing witnesses.

EDWARD J. PRECOURT.

Witnesses:
WILLIAM BARNES,
JOSEPH W. ESTABROOK.